Patented Dec. 18, 1928.

1,695,654

UNITED STATES PATENT OFFICE.

WINFRID HENTRICH, OF WIESDORF, NEAR COLOGNE-ON-THE-RHINE, GERMANY, ASSIGNOR TO GRASSELLI DYESTUFF CORPORATION, OF NEW YORK, N. Y., A CORPORATION OF DELAWARE.

AZO DYESTUFF AND CELLULOSE DERIVATIVES DYED THEREWITH.

No Drawing. Application filed February 4, 1927, Serial No. 166,013, and in Germany February 26, 1926.

It has been found that new water-soluble direct monoazo dyes for cellulose derivatives such as acidyl cellulose, cellulose esters, cellulose ethers and their transformation products may be obtained by coupling diazo compounds of dinitroaminophenols or their derivatives with unsulfonated and non-carboxylated aminonaphthols in the presence of mineral acid binding agents. The dyes so obtained dye brownish-red, brown, and violet to black colors which are characterized by their remarkable fastness properties, especially their fastness to washing and wetting. It is of especial importance that now for the first time, by the use of these dyes, acetate silk may be dyed deep black colors directly by means of water-soluble dyestuffs from a neutral or slightly acid bath. By diazotizing and developing the dyes upon the fibers the dyed colors are deepened and the fastness properties, especially the overcolor and light fastness properties, are improved.

Example 1.

The diazo-compound obtained by diazotizing 199 parts by weight of 4.6-dinitro-2-amino-1-hydroxybenzol after being separated by filtering under suction and stirred into a small quantity of water is mixed with a neutral water solution of 195 parts by weight of the hydrochloride of 1-amino-8-hydroxynaphthalene at 0° C. and then a water solution of about 1000 parts by weight of calcined sodium carbonate is gradually added while maintaining the mixture well cooled and agitated. The formation of the dyestuff takes place quickly. When the coupling is complete the dyestuff is filtered off, washed, pressed and dried. The product is readily soluble in water and dyes acetate silk directly from a neutral or slightly acid bath a deep black color of good fastness to wetting and washing. By diazotizing the dyestuff upon the fibers and developing with 2.4-tolylenediamine dyeings of a beautiful deep black color having excellent washing, wetting, overcolor and light fastness properties are obtained. Developing with ethyl-2-naphthylamine gives violet black dyeings having similar fastness properties.

By substituting 1-amino-6-hydroxynaphthalene for the 1-amino-8-hydroxynaphthalene of the foregoing example one may obtain a readily soluble dyestuff which dyes acetate silk a violet tinged brown color having the same fastness properties. By diazotizing and developing with phenol or 2-naphthol-3-carboxylic acid dyeings of a deep violet-brown color having good washing, wetting and overcolor fastness properties are obtained. The use of 2-amino-8-hydroxynaphthalene gives a water-soluble glossy brownish violet dyestuff which penetrates acetate silk well. The dyestuff when diazotized and developed on the fiber with resorcinol gives a reddish brown and with 2.4-tolylenediamine or 2-naphthol-3-carboxylic acid or phenol or phenylmethylpyrazolone a beautiful red-brown color. All of the dyestuffs referred to possess good washing, wetting and overcolor fastness properties. The replacement of 2-amino-8-hydroxynaphthalene by 1-amino-5-hydroxynaphthalene gives a direct dye for acetate silk of a black-brown color having a violet tint. The same dyestuff diazotized and developed on the fiber with 2-sodium naphtholate or 2.4-toluylenediamine or phenol or 2-naphthol-3-carboxylic acid or phenylmethyl pyrazolone gives deep brown colors, and with resorcinol beautiful black-brown colors. These colors also exhibit the above mentioned fastness properties.

The dyestuff produced in accordance with the foregoing example by coupling diazotized 4.6-dinitro-2-amino-1-hydroxybenzol with 1-amino-8-hydroxynaphthalene has most probably the formula:

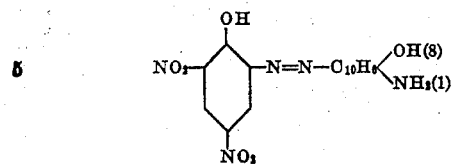

By reduction the dyestuff gives 2.4.6-triamino-1-hydroxybenzol and an amino-1.8-aminonaphthol. The formula of the dyestuff deposited upon the fiber by developing with 2.4-toluylenediamine most probably is:

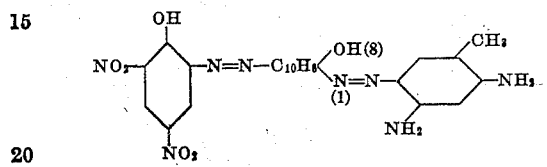

*Example 2.*

The diazo-compound of 213 parts by weight of partially reduced 2.4.6-trinitro-1-hydroxy-3-methylbenzol (a mixture of 4.6-dinitro-2-amino-3-methyl-1-hydroxybenzol and 2.4-dinitro-6-amino-3-methyl-1-hydroxybenzol; methylpicraminic acid) is mixed with a neutral solution of 195 parts by weight of the hydrochloride of 1-amino-7-hydroxynaphthalene. A sodium acetate solution is then added gradually with agitation and cooling until the reaction mixture no longer turns Congo paper blue. After the coupling is completed the reaction mixture is made alkaline with sodium carbonate and worked up in the usual way. The resulting water-soluble dyestuff dyes acetate silk a violet-brown color. By diazotizing and developing the dye upon the fiber with 2-sodium naphtholate one obtains a black-brown, with ethyl-2-naphthylamine a russet green and with 2.4-toluylenediamine a deep brown color. All of the colors possess excellent fastness properties.

The dyestuff formed in accordance with the foregoing example by coupling the diazo-compound of partially reduced 2.4.6-trinitro-1-hydroxy-3-methylbenzol comprises two compounds having most probably the formulæ:

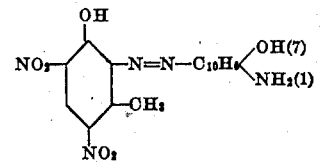

and

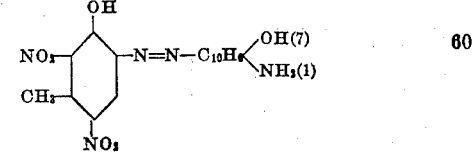

Both compounds, upon reduction, give the same products, i. e., 2.4.6-triamino-3-methyl-1-hydroxybenzol and an amino-1.7-aminonaphthol.

The dye deposited upon the fiber by development with 2-sodium naphtholate probably has the formula:

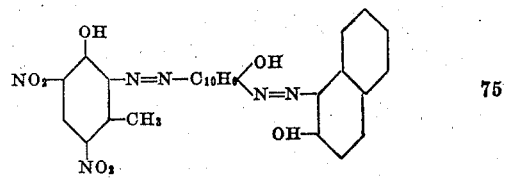

and

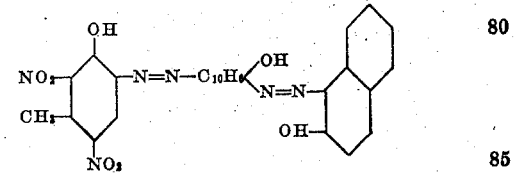

The dyes are all dark powders readily soluble in warm water.

I claim:

1. As a new product dyestuffs substantially identical with dyestuffs obtainable by coupling the diazo compound of a dinitroaminophenol with an unsulfonated and non-carboxylated aminonaphthol in the presence of an acid binding agent, said dyestuffs being in dry powdered form dark powders readily soluble in warm water, capable of directly dyeing acetate silk a fast color from a neutral or slightly acid bath and having the probable general formula:

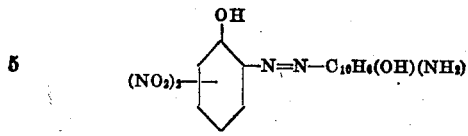

wherein the benzene ring may contain an alkyl group.

2. As a new product, a dyestuff substantially identical with a dyestuff obtainable by coupling the diazo-compound of 4.6-dinitro-2-amino-1-hydroxybenzol with 1-amino-8-hydroxynaphthalene having most probably the formula:

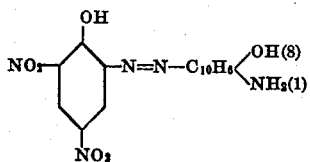

3. As a new product, a cellulose derivative dyed with a dyestuff of claim 1.

4. As a new product, a cellulose derivative dyed with a dyestuff substantially identical with the dyestuff obtainable by coupling the diazo-compound of 4.6-dinitro-2-amino-1-hydroxybenzol with 1-amino-8-hydroxynaphthalene, said dyestuff having most probably the formula:

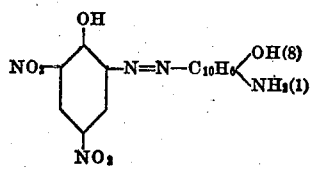

In testimony whereof, I affix my signature.

WINFRID HENTRICH.